Patented July 17, 1923.

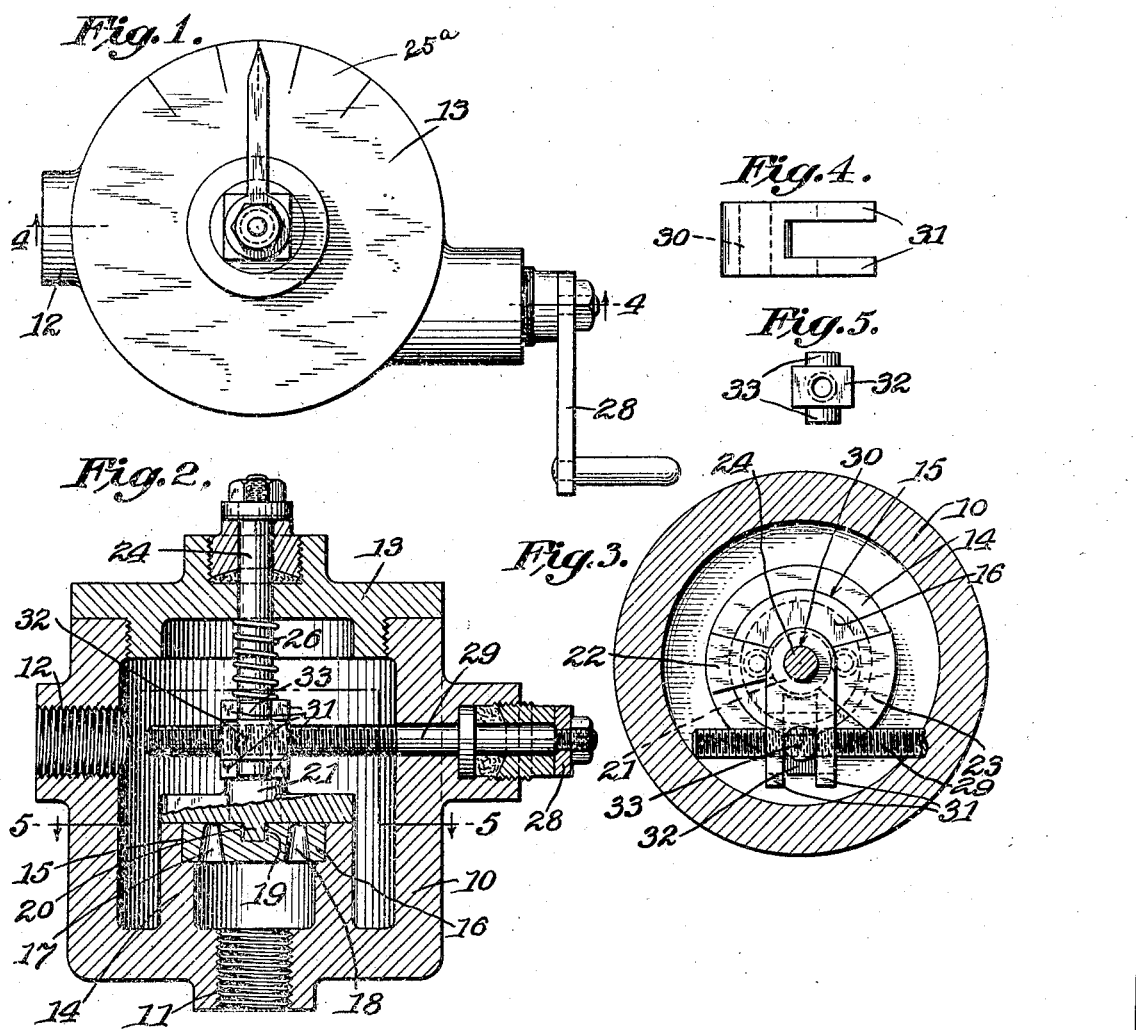

1,462,110

UNITED STATES PATENT OFFICE.

JACOB T. HOSTETTER AND FREDERICK J. KEISER, OF SHARON, PENNSYLVANIA.

VALVE.

Application filed August 18, 1922. Serial No. 582,827.

*To all whom it may concern:*

Be it known that we, JACOB T. HOSTETTER and FREDERICK J. KEISER, citizens of the United States, and residents of Sharon, in the county of Mercer, in the State of Pennsylvania, have invented certain new and useful Improvements in Valves, of which the following is a specification.

Our present invention relates to valves for distributing a fluid in regulated amounts.

The primary object of the invention is the provision of such a valve which will be of simple construction, which will have a minimum number of parts, which will have a fine adjustment and which may be cleaned with ease.

To this end our invention includes a casing having a fluid inlet and outlet, a valve seat within the casing, an aperture plate adjacent the seat having apertures therein and a rotary valve thereon operable from a point without the casing to cover and uncover the apertures in the plate.

We have illustrated a satisfactory embodiment of the invention in the drawings, which is to be taken as merely one form of construction, in which:—

Fig. 1 is a plan view of a modification.

Fig. 2 is a sectional elevation along line 4—4 of Fig. 1.

Fig. 3 is a sectional plan along line 5—5 of Fig. 2.

Figs. 4 and 5 are details.

Referring now to the drawings, a casing is illustrated at 10 having a fluid inlet 11 and fluid outlet 12, a perforated cap 13 being fitted to the casing for a purpose more fully hereinafter described.

Adjacent the fluid inlet 11 and within the casing 10 we provide a chamber having upstanding walls 14, said chamber being of any desired shape, but shown round for convenience. A portion of the upper inner part of the wall 14 is cut away as at 15 within which is seated an aperture plate 16 having apertures 17 and 18. We have shown the apertures, as two in number and circular, although obviously any desired number may be provided of any shape. Plate 16 is provided with a recess 19 preferably centrally located, within which seats a projecting lug or pin 20 of a valve 21. Said valve has a substantially plane under surface seating upon plate 16 and the upper part of walls 14 and having vanes 22 and 23 of any desired shape or size. A vertical shaft 24 secured to the valve 21 penetrates the cap 13 and is provided with an ordinary stuffing box to prevent leakage of fluid. A pointer 25 secured to the end of shaft 24 indicates on a dial 25$^a$ on the top 13, the relation of the valve 21 to the aperture 18. Bearing against the casing cap 13 and exerting pressure downwardly on the valve 21, we provide a spring 26 of strength sufficient to retain the valve on its seat against the pressure of the incoming fluid.

Suitable means are provided to cause rotation of the valve 21 through its shaft 24, and in one form we may extend the pointer 25 on the opposite side of the shaft 24 to form an operating handle 27. Obviously movement of this handle will cause rotation of the shaft 24 and valve 21.

In another form we may provide an operating handle 28 secured to a side shaft 29 penetrating the casing and at right angles to the shaft 24. A stuffing box around the shaft 29 prevents accidental leakage of fluid from the casing at this point. A yoke having an aperture 30 adapted to receive the shaft 24 and to which the shaft is keyed, is provided with two arms 31 extending outwardly therefrom. An internally threaded trunnion 32 having lugs 33 at top and bottom thereof, is adapted to be positioned between the arms 31 of the yoke, the threaded shank of the shaft 29 engaging the interior threads of the trunnion.

Rotation of the part 29 will cause a swinging motion of the yoke about the shaft 24 as a pivot, thus covering and uncovering the apertures in the plate as desired.

The apertures in the plate 16 are frusto-conical in order to prevent refuse or dirt from accumulating against the valve and thus diminishing its efficiency.

In operation of the device, the shaft 24 is caused to rotate in either direction according to the amount of the fluid desired. By rotating the shaft 24 clockwise, both apertures 17 and 18 are uncovered simultaneously. Rotation counter-clockwise causes aperture 17 to uncover first, the broader vane 23 keeping aperture 18 covered until the whole of aperture 17 is exposed. By this method a fine adjustment may be secured as well as a gate action.

The cap 13 may be removed for the purpose of cleaning, upon which removal the valve mechanism is also removed.

What is claimed is:—

A valve including a casing having a fluid inlet and outlet, an apertured valve seat within the casing, a valve movable on said seat to cover and uncover the aperture therein, and means to move said valve, said means including a shaft rotatable at right angles to the axis of the valve, and a swinging member movable by said shaft carrying a threaded trunnion.

In testimony whereof we affix our signatures.

JACOB T. HOSTETTER.
FRED. J. KEISER.